United States Patent [19]

Hines, Jr.

[11] Patent Number: 5,470,126
[45] Date of Patent: Nov. 28, 1995

[54] RETRACTABLE HARDTOP VEHICLE ROOF

[75] Inventor: Charles P. Hines, Jr., Hamburg, Mich.

[73] Assignee: MascoTech Automotive Systems Group, Inc., Auburn Hills, Mich.

[21] Appl. No.: 146,851

[22] Filed: Nov. 3, 1993

[51] Int. Cl.⁶ ................................................. B60J 7/12
[52] U.S. Cl. ................................... 296/219; 296/223
[58] Field of Search ........................... 296/108, 219, 296/223; 280/756

[56] References Cited

U.S. PATENT DOCUMENTS

| | | | |
|---|---|---|---|
| 1,893,349 | 1/1933 | Austin | 296/107 |
| 2,007,873 | 7/1935 | Paulin | 296/107 X |
| 2,785,922 | 3/1957 | Chika | 296/107 |
| 2,919,156 | 12/1959 | Dodge | 296/107 |
| 2,939,742 | 6/1960 | Dardarian et al. | 296/107 |
| 3,347,738 | 12/1967 | Renneker | 296/107 |
| 3,357,738 | 12/1967 | Bourlier | 296/108 |
| 3,545,806 | 12/1970 | Ventre | 296/223 |
| 3,599,813 | 8/1971 | Totz | 280/756 X |
| 3,823,977 | 6/1974 | Fioravanti | 296/216 X |
| 4,895,409 | 1/1990 | Konishi et al. | 296/107 |
| 4,968,089 | 1/1991 | Murai et al. | 296/219 |
| 5,018,784 | 5/1991 | Yokouchi et al. | 296/219 |
| 5,029,932 | 7/1991 | Parr | 296/107 |
| 5,033,789 | 7/1991 | Hayashi et al. | 296/216 |
| 5,078,447 | 1/1992 | Klein et al. | 296/107 |

FOREIGN PATENT DOCUMENTS

| | | | |
|---|---|---|---|
| 4038873 | 6/1992 | Germany | 296/108 |

*Primary Examiner*—Dennis H. Pedder
*Attorney, Agent, or Firm*—Edgar A. Zarins; Malcolm L. Sutherland

[57] ABSTRACT

A retractable hardtop roof for a vehicle for selectively converting the passenger compartment from a closed compartment to an open air compartment. The roof moves along a low profile to permit opening even while the vehicle is moving. The roof conversion includes a frame track mounted within the vehicle body to guide and drive the roof panels. The retractable roof comprises a top panel and a back panel which are hingedly connected. The back panel is in turn hingedly connected to the frame for full pivotting movement of the panels relative to the vehicle body. A drive mechanism attached to the top panel moves the vehicle roof panels along overhead and rear tracks in the frame for full retraction rear of the passenger compartment. Power for the drive mechanism is conducted through metal components of the vehicle top eliminating the need for wiring.

3 Claims, 3 Drawing Sheets

RETRACTABLE HARDTOP VEHICLE ROOF

BACKGROUND OF THE INVENTION

1. Field of the Invention

This invention relates to convertible tops of the type used on vehicles and, in particular, to a hardtop roof for a vehicle which can be selectively retracted from a position enclosing the passenger compartment to an open position wherein the roof is stored near the back of the passenger compartment.

2. Description of the Prior Art

Convertible vehicles are widely popular to provide the passengers of a vehicle an open air experience while driving. The traditional convertible top has been limited to passenger vehicles and includes a soft vinyl top mounted to a frame structure. The top attaches to the front header to enclose the passenger compartment. To open the passenger compartment, the vehicle must be brought to a complete stop to fold the frame and top material rearward for storage in the rear boot. Because the top must be compactly folded for storage, the top material is thin and pliable providing only a minimal barrier against the elements.

Retractable hardtop roofs for vehicles have been developed to provide limited openness of the passenger compartment. Typically such roofs have also been developed which facilitate exposure of a greater portion of the passenger compartment. However, these vehicles roofs have been limited to traditional passenger vehicles since utility trucks and the like incorporate different configurations and restrictions.

SUMMARY OF THE PRESENT INVENTION

The present invention overcomes the disadvantages of the prior known convertible vehicles by providing a retractable hard top vehicle roof particularly suited for the passenger compartment of a utility truck.

The retractable hard top roof of the present invention includes a frame track which conforms to the top and rear panel of the passenger compartment. The frame is mounted within the vehicle roof and includes a track along both sides adapted to cooperate with the drive mechanism for the roof. The roof comprises a top panel and a back panel hingedly connected together. The back panel is in turn hingedly connected to the rear of the frame while the top panel carries the drive mechanism. The drive mechanism includes end tractor wheels which cooperate with and move along the track in the frame. The drive mechanism connected to the front header moves along the upper and rear track portions to fold the roof rear of the passenger compartment. The roof may be stopped anywhere along the track providing a slightly open roof for ventilation to a full open passenger compartment.

The drive mechanism incorporates a central motor which, through outwardly extending axles, drives the end tractor wheels along the track. Power for the motor is delivered from the vehicle electrical system through the metal components of roof eliminating electrical wires which can become tangled or severed. The low profile movement of the roof allows retraction or closure even as the vehicle is in motion.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which.

DETAILED DESCRIPTION OF A PREFERRED EMBODIMENT OF THE PRESENT INVENTION

Figure 1:
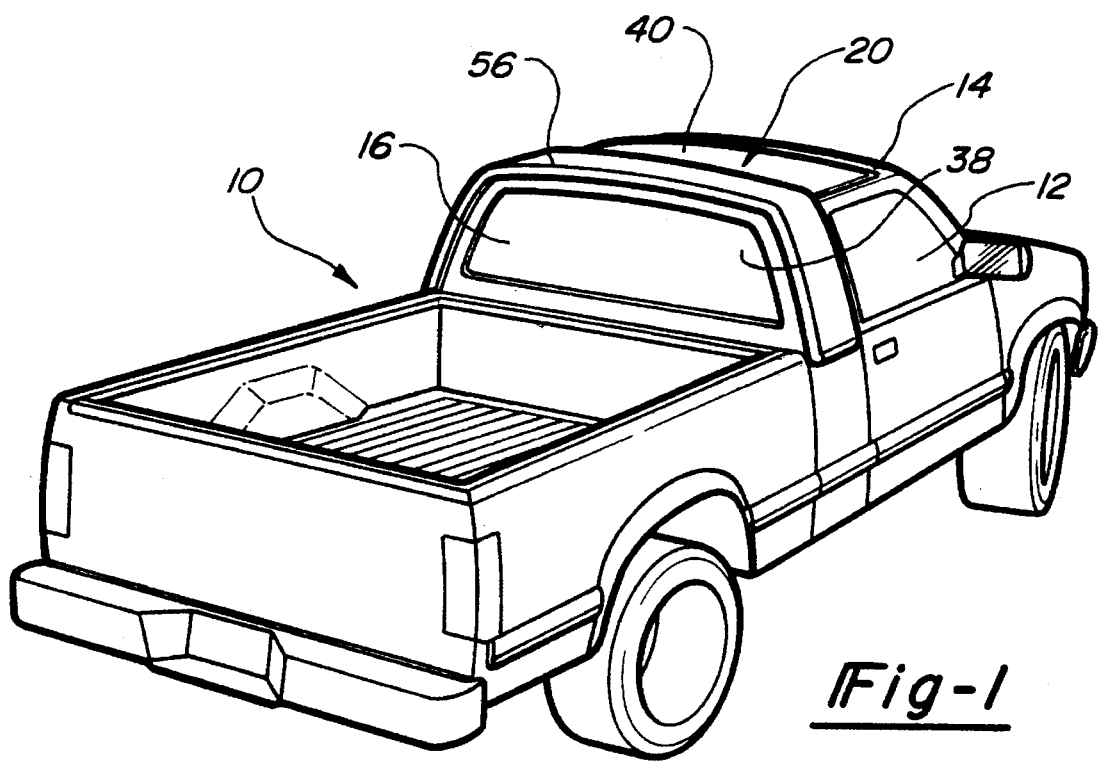
FIG. 1 is a rear perspective view of a vehicle incorporating the retractable hard top roof of the present invention.
Figure 2:
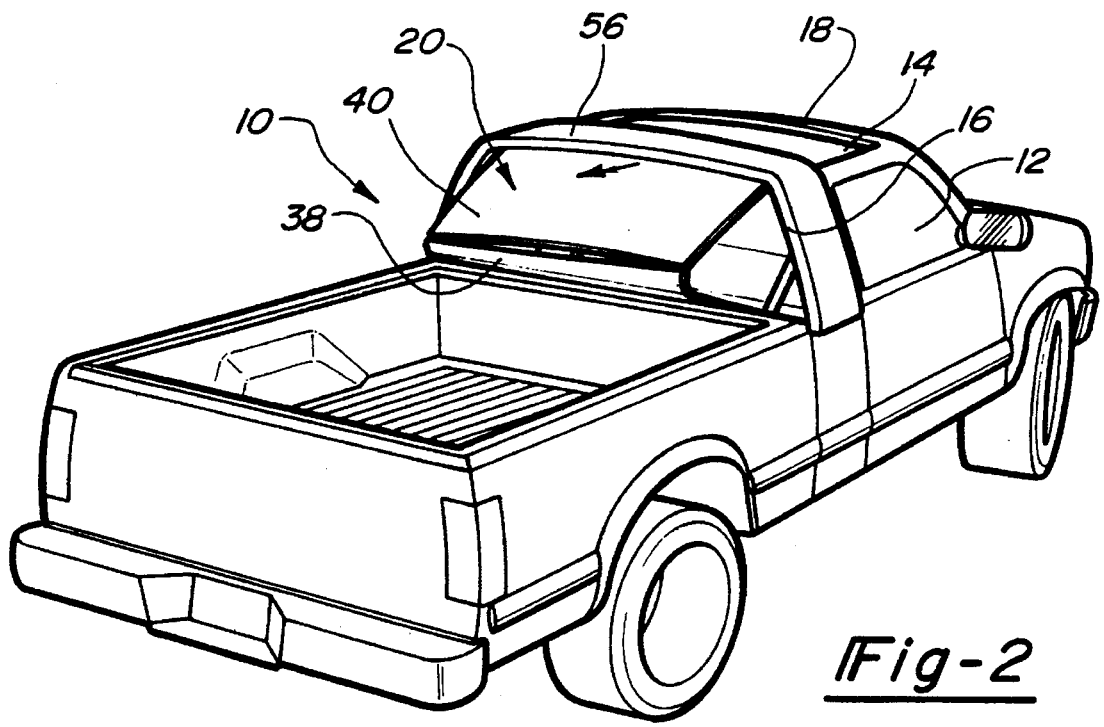
FIG. 2 is a rear perspective view showing the vehicle roof partially retracted to expose the passenger compartment.

Referring first to FIGS. 1 and 2, there is shown a rear perspective view of a vehicle 10 embodying the retractable hardtop vehicle roof 20 of the present invention. The roof 20 of the present invention is best suited for utility vehicles such as is shown in the drawings. The vehicle 10 includes a passenger compartment 12 which is enclosed by a top 14 and a rear 16 portion. A header 18 at the top of the windshield separates top 14 therefrom.

Figure 3:
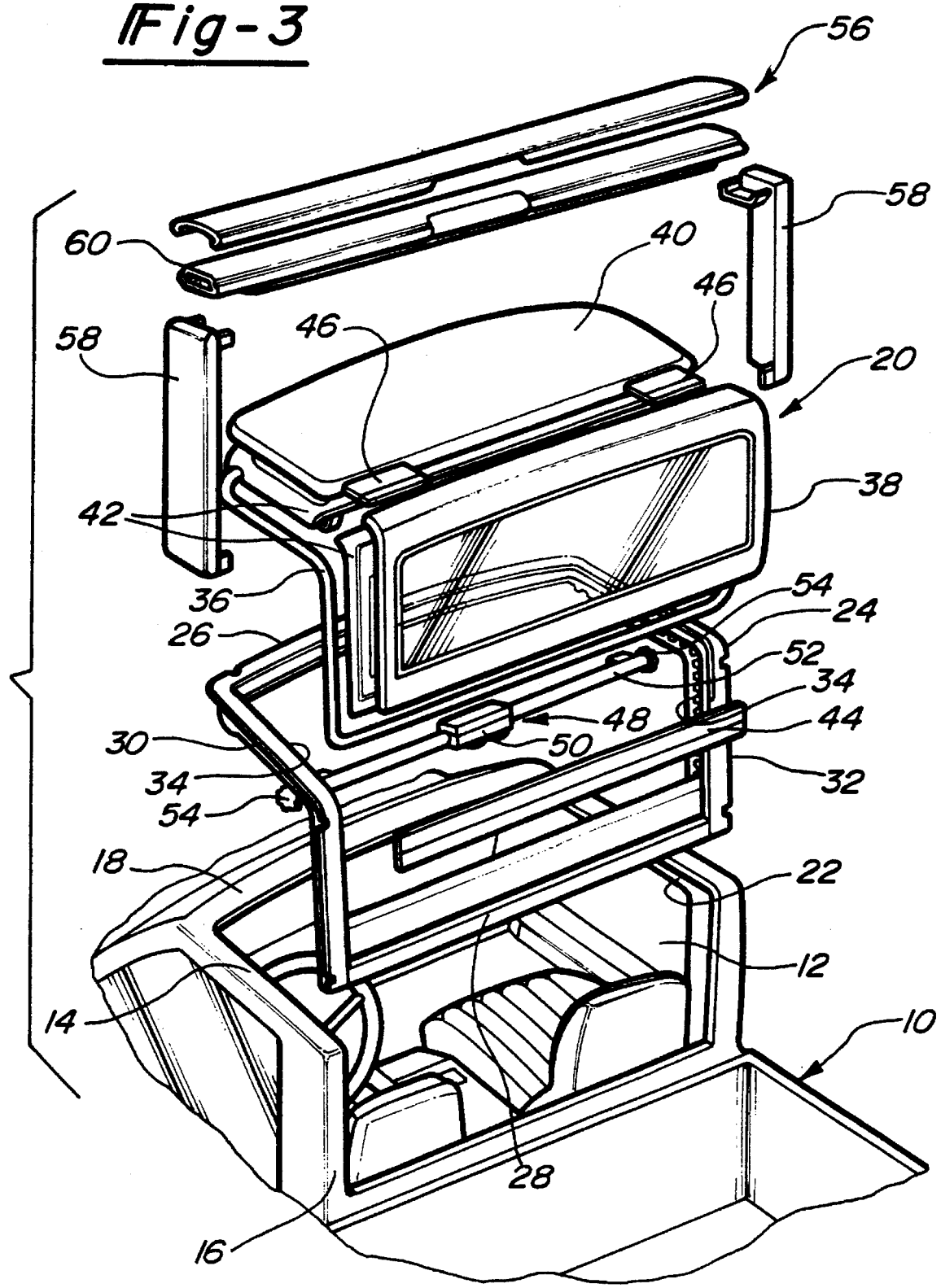
FIG. 3 is an exploded view of the vehicle roof.
Figure 4:
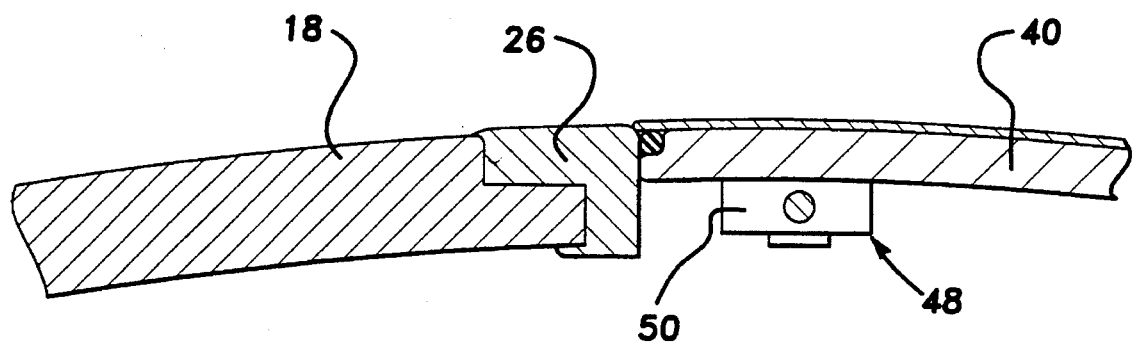
FIG. 4 is a view of the front of the hard top roof.

Referring now to FIG. 3, an exploded view of the retractable hardtop roof 20 is shown. The roof system 20 is designed to fit within the existing top 14 and rear 16 structure of the passenger compartment 12 requiring a minimum of conversion of the vehicle 10. The vehicle 10 may be constructed with a cut out 22 formed along the top 14 and rear 16 portion of the vehicle 10 or an existing vehicle 10 may be converted by removing an appropriate portion of the vehicle roof to form the necessary cut out 22 for supporting and guiding the hardtop roof through its movement. In a preferred embodiment, the guide frame 24 has a substantially rectangular configuration with a header bar 26 which cooperates with the header 18 of the passenger compartment 12, a bottom bar 28 and side members comprising a horizontal segment 30 and a vertical segment 32. The horizontal segment 30 combines with the header bar 26 to frame the cut out 22 within the top portion 14 of the passenger compartment 12. The vertical segment 32 combines with the bottom bar 28 to frame the cut out 22 within the rear portion 16 of the passenger compartment 12. The frame 24 is an integral structure facilitating insertion within the roof structure of the passenger compartment 12.

The guide frame 24 incorporates a pair of spaced apart continuous tracks 34 along the side members including horizontal tracks along the horizontal segment 30 of the frame 24 and vertical tracks along the vertical segment 32 of the frame 24. The tracks 34 are in the nature of a series of notches facilitating traction along the side members of the frame 24. A seal element 36 is provided for sealing the periphery of the frame 24 against leaks.

The retractable roof 20 itself preferably comprises a pair of rigid panels: a rigid back panel 38 and a rigid top panel 40. In the closed position, the back panel 38 is seated within the rear portion 16 of the passenger compartment 12 while the top panel 40 is seated within the top portion 14 thereof. The panels include decorative trim 42 for insulation and aesthetic purposes.

The back panel 38 is pivotably connected to the frame 24 by a hinge 44. The hinge 44 is connected to a lower edge of the back panel 38 and a lower end of the vertical segment 32 of the frame 24. As a result, the back panel 38 will pivot relative to the lower end of the frame 24.

The top panel 40 is pivotally connected to the back panel 38 by at least one hinge 46. The hinges 46 are connected to an upper edge of the back panel 38 and to a rearward edge of the top panel 40 allowing complete pivoting motion of the panels.

Attached to a front edge of the top panel 40 is the drive means 48 for operatively opening and closing the roof 20. The drive means 48 comprises a drive motor 50 which is drivingly connected by outwardly extending transfer rods 52 to drive wheels 54. The drive means 48 is mounted to the top panel 40 proximate the front edge to facilitate engagement of the drive wheels 54 with the tracks 34 of the guide frame 24. The drive wheels 54 preferably include a plurality of circumferentially spaced nobs adapted to cooperate with the notches of the drive tracks 34. By mounting the drive means 48 along the front edge of the top panel 40 the edge will remain close to the guide frame 24 allowing complete pivotting of the roof panels 38 and 40.

Referring now to FIG. 3, an exploded view of the retractable hardtop roof 20 is shown. The roof system 20 is designed to fit within the existing top 14 and rear 16 structure of the passenger compartment 12 requiring a minimum of conversion of the vehicle 10. The vehicle 10 may be constructed with a cut out 22 formed along the top 14 and rear 16 portion of the vehicle 10 or an existing vehicle 10 may be converted by removing an appropriate portion of the vehicle roof to form the necessary cut out 22 for supporting and guiding the hardtop roof through its movement. In a preferred embodiment, the guide frame 24 has a substantially rectangular configuration with a header bar 26 which cooperates with the header 18 of the passenger compartment 12, a bottom bar 28 and side members comprising a horizontal segment 30 and a vertical segment 32. The horizontal segment 30 combines with the header bar 26 to frame the cut out 22 within the top portion 14 of the passenger compartment 12. The vertical segment 32 combines with the bottom bar 28 to frame the cut out 22 within the rear portion 16 of the passenger compartment 12. The frame 24 is an integral structure facilitating insertion within the roof structure of the passenger compartment 12.

The guide frame 24 incorporates a pair of spaced apart continuous tracks 34 along the side members including horizontal tracks along the horizontal segment 30 of the frame 24 and vertical tracks along the vertical segment 32 of the frame 24. The tracks 34 are in the nature of a series of notches facilitating traction along the side members of the frame 24. A seal element 36 is provided for sealing the periphery of the frame 24 against leaks.

Because of the reduction of the structural integrity of the passenger compartment 12 as a result of the cut out 22, a reinforcement bar 56 is preferably added. The reinforcement bar 56 includes a pair of pillars 58 and a cross bar 60 extending between the tops of the pillars 58. The reinforcement bar 56 is mounted exteriorly of the passenger compartment 12 such that the retractable roof 20 extends beneath the bar 56.

The retractable hardtop roof 20 of the present invention allows selective exposure of the passenger compartment 12 by moving the roof 20 between the closed position shown in FIG. 1 and a full open position. As desired, the roof 20 may be opened any degree to provide partial exposure. Operation of the roof 20 is controlled through the drive means 48 and specifically the drive motor 50. In order to eliminate wires which may become tangled or severed, power to the motor 50 is conducted through the metal components of the roof system. Upon engagement of the appropriate button, the drive means 48 is activated to rotate the drive wheels 54 in a first direction for travel along the tracks 34. The top panel 40 is pushed backward pivoting the back panel 38 at its lower end hinge 28 and the hinges 46 as shown in FIG. 2. Once the drive wheels 54 reach the juncture of the top segment 30 and the back segment 32, the top panel 40 will be pushed downwardly along the vertical tracks until the panels 38 and 40 are folded into flush engagement with each other. To close the roof, the drive means 48 is operated to move the roof 20 in the opposite direction until the front edge of the top panel 40 engages the header bar 26 to sealingly enclose the passenger compartment.

The foregoing detailed description has been given for clearness of understanding only and no unnecessary limitations should be understood therefrom as some modifications will be obvious to those skilled in the art without departing from the scope and spirit of the appended claims.

What is claimed is:

1. A retractable hardtop roof for a vehicle having a passenger compartment, said passenger compartment being enclosed by a front windshield with a header, a top portion and a rear portion, said retractable hardtop roof comprising:

a guide frame mounted to said top and rear portion of said passenger compartment, said guide frame including a pair of spaced horizontal tracks along said top portion and a pair of spaced vertical tracks along said rear portion, said spaced horizontal and vertical tracks forming spaced continuous tracks along outboard sides of the passenger compartment;

a rigid back panel pivotably connected to said guide frame at the lower end of said spaced vertical tracks;

a rigid top panel pivotably connected to said back panel, said top panel having a front edge sealingly engageable with the header; and drive means mounted to said top panel proximate said front edge, said drive means including at least two spaced drive wheels cooperatively engaging respective spaced tracks, said at least two spaced drive wheels selectively moving along respective spaced horizontal tracks and vertical tracks to selectively move said rigid panels between a closed position enclosing said passenger compartment and an open position exposing said passenger compartment, said front edge of said rigid top panel being maintained in substantially parallel alignment with the top portion of the passenger compartment as said spaced drive wheels move along said horizontal tracks such that said front edge travels along a plane formed by the top portion of the passenger compartment.

2. The retractable roof as defined in claim 1 wherein said drive means includes a drive motor drivingly connected to said drive wheels to move said top panel along said guide frame until said drive means is proximate said lower end of said spaced vertical tracks.

3. A retractable hardtop roof for a vehicle having a passenger compartment, said passenger compartment being enclosed by a front windshield with a header, a top portion and a rear portion, said retractable hardtop roof comprising:

a guide frame mounted to said passenger compartment and including a substantially horizontal segment mounted within said top portion of said passenger compartment and a substantially vertical segment mounted within said rear portion of said passenger compartment;

track means within said guide frame, said track means including a pair of spaced horizontal tracks along said horizontal segment and a pair of spaced vertical tracks along said vertical segment, said horizontal tracks cooperating with said vertical tracks to form a pair of spaced apart continuous tracks along opposing sides of the passenger compartment;

a rigid back panel hingedly connected to said guide frame at the lower end of said spaced vertical tracks;

a rigid top panel hingedly connected to said back panel; and drive means mounted to said top panel, said drive means including a drive motor and a pair of spaced apart drive wheels drivingly connected to said drive motor, said drive wheels cooperatingly engaging respective spaced apart tracks, said drive wheels selectively moving along said horizontal tracks and vertical tracks to selectively move said rigid panels between a closed position enclosing said passenger compartment and an open position exposing said passenger compartment, a front edge of said top panel being maintained in substantially parallel alignment with a plane formed by said horizontal segment to move said rigid top panel along the top portion of the passenger compartment as said spaced drive wheels move along said horizontal tracks.

* * * * *